July 7, 1936.   J. C. JORGENSEN   2,046,462
POWER TRANSMISSION MECHANISM
Filed Dec. 3, 1934   2 Sheets-Sheet 1

INVENTOR —
Jacob C. Jorgensen
By his Attorney
Harlow M. Davis

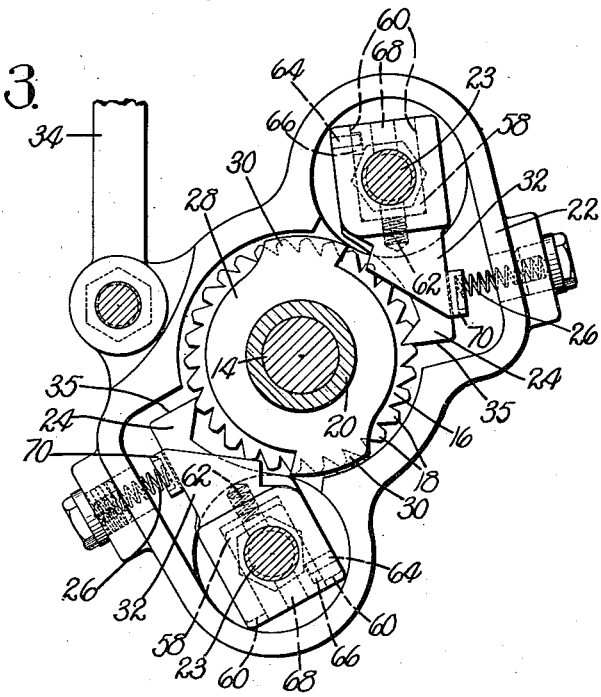
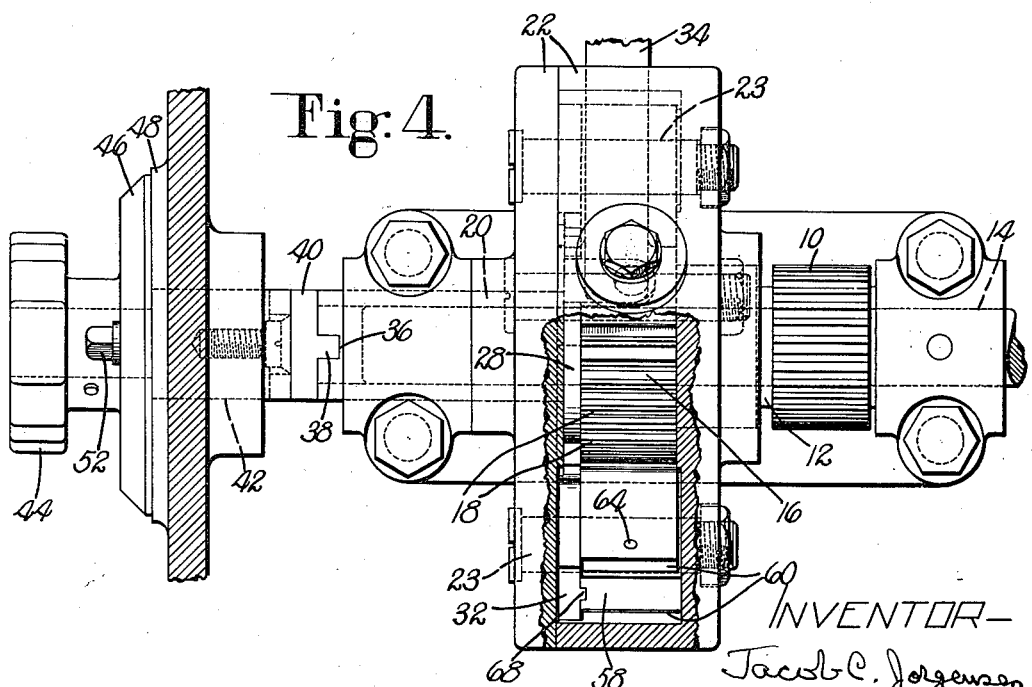

Patented July 7, 1936

2,046,462

UNITED STATES PATENT OFFICE 2,046,462

POWER TRANSMISSION MECHANISM

Jacob C. Jorgensen, Beverly, Mass., assignor to United Shoe Machinery Corporation, Paterson, N. J., a corporation of New Jersey Application December 3, 1934, Serial No. 755,703

12 Claims. (Cl. 74—151)

This invention relates to power transmission mechanism and more particularly to mechanism whereby power is transmitted through a pawl acting on at least one of a series of teeth connected to the means which is operated by the mechanism.

It is one well-known form of mechanism of the above-mentioned character the pawl, supported on a pawl carrier which is moved to operate it, is controlled by means which maintains it out of operative relation to the series of teeth until after the beginning of the movement of the pawl carrier and then releases it to permit it to be forced into the space between two teeth by a spring provided for that purpose, the pawl then operating by engagement with one of the teeth to transmit movement to the series of teeth in the continued movement of the pawl carrier. An object of the present invention is to provide a construction such as to insure that under any conditions the pawl will not be prevented from fully entering the space between two teeth by its frictional contact with the tooth against which it operates, so as to avoid possible danger of breakage of the pawl or of one of the teeth by reason of its failure fully to enter such space. For the purpose in view, the invention, in one aspect, provides for limited movement of the pawl carrier against yielding resistance relatively to the means to which power is transmitted through the mechanism, or relatively to the series of teeth, after the pawl arrives in operative engagement with one of the teeth, so as to afford ample time for the pawl to be seated properly between the teeth by the spring which controls it before its full force is applied to the tooth against which it acts. More particularly, in the illustrative embodiment of the invention, there is a yielding connection between the pawl and the pawl carrier such as to permit the carrier to move relatively to the pawl in a direction lengthwise of the pawl, i. e., in the direction in which it transmits its operating force to the pawl, to afford time for the pawl to be seated properly, after which the pawl carrier acts positively on the pawl to operate it.

The novel features of the invention will now be more particularly described by reference to the accompanying drawings and pointed out in the claims.

In the drawings,

Fig. 3 is a sectional view in the same plane as the upper portion of Fig. 1, showing the parts in positions which they occupy when operating; and Fig. 4 is a view in right-hand side elevation of the mechanism shown in Figs. 1 and 3, with a portion of the structure broken away.

Power transmission mechanism of the type to which the invention relates has been utilized heretofore, for example, in machines for lasting the heel ends of shoes, as disclosed in United States Letters Patent No. 1,583,044, granted on May 4, 1926 upon an application of C. H. Hoyt. In accordance with that disclosure such mechanism is utilized to impart to the shoe-supporting jack a shoe-clamping movement in the course of the power operation of the machine, after the jack has received a preliminary shoe-positioning movement imparted thereto by the operator before the starting of the machine. The invention is herein illustrated as embodied in mechanism particularly designed for use in a machine of that character, although it is to be understood that it is not thus limited in its applicability, but may be used in various kinds of machines.

Figure 1:
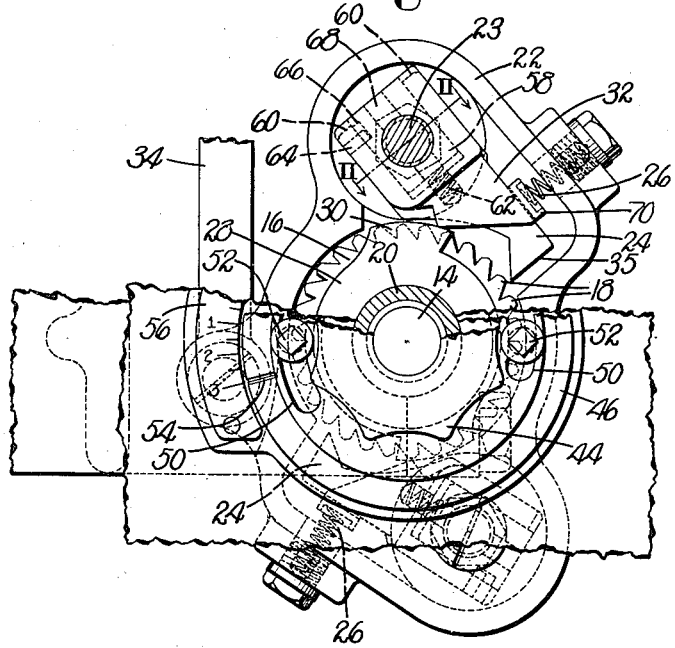
Fig. 1 is a view in elevation of power transmission mechanism in which the invention is embodied, with a portion of the structure broken away, the parts being shown in their starting positions.
Figure 2:
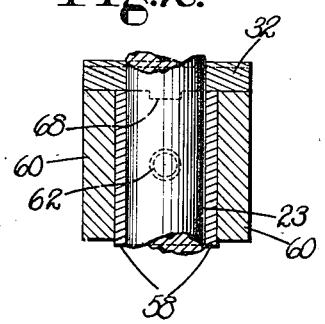
Fig. 2 is a section on the line II—II of Fig. 1.

The power transmission mechanism shown comprises a pinion 10 (Fig. 4) adapted to drive the means to which the power is transmitted. The pinion is formed on a sleeve 12 mounted to turn on a fixed shaft 14 supported on the frame of the machine. Fast on or integral with the sleeve 12 is a wheel 16 having on its periphery a series of teeth 18 which as shown are in the form of ratchet teeth. Mounted to turn on the sleeve 12 and on another sleeve 20 hereinafter referred to which is mounted on the shaft 14, is a pawl carrier 22. Supported for swinging movements about studs 23 on this pawl carrier, by means hereinafter described, are two pawls 24 arranged to act on the teeth 18 to turn the sleeve 12 and the pinion 10 in response to movement of the pawl carrier 22 in a clockwise direction (Figs. 1 and 3). The pawls are duplicated merely for greater precision in the operation of the mechanism, the arrangement being such that one or the other of them alone acts to turn the wheel 16, depending upon the relative positions of the parts. Each pawl is controlled by a spring 26 supported on the pawl carrier 22 and tending to swing the pawl toward the teeth 18. Initially, by reason of the position of the pawl carrier, both pawls are held out of operative relation to the teeth 18, as illustrated in Fig. 1, by a disk 28 which is fast on or integral with the previously mentioned sleeve 20 and is provided near each pawl with a segmental projection 30 arranged to engage a plate 32 which is connected to the pawl, as hereinafter described, to turn therewith about the stud 23. Oscillatory movements are imparted to the pawl carrier 22 through a link 34 by suitable operating mechanism. When the pawl carrier is turned in a clockwise direction from the starting position illustrated in Fig. 1, the pawls are maintained out of operative relation to the teeth 18 until the plates 32 slip off the ends of the segmental projections 30, whereupon the springs 26 force the pawls inwardly toward the teeth 18, and as the pawl carrier continues its movement the end face 35 of one or the other of the pawls abuts against one of the teeth and thereby serves to turn the pinion 10 and thus to operate the means which is connected to the pinion. When the pawl carrier is turned in the opposite direction at a later time in the operation of the machine, the pawls slip over the teeth 18 and are finally withdrawn from contact with the teeth by the action of the projections 30 on the plates 32. This leaves the pinion 10 free for reverse turning movement to any position in response to movement of the means connected to the pinion.

The mechanism shown includes, as heretofore, means for varying the time in the movement of the pawl carrier 22 when the pawls are released by the projections 30 and for thereby varying the amount of movement imparted to the toothed wheel 16 in the operation of the mechanism. For this purpose the sleeve 20 carrying the disk 28 on which the projections 30 are formed is mounted to turn about the shaft 14 and is provided in one end with notches 36, one of which is shown in Fig. 4, into which extend projections 38 formed on a member 40. This member is secured to one end of a short shaft 42 mounted to turn in a bearing in the frame of the machine, and secured on a reduced portion of the shaft 42 at its other end is a hand wheel 44 for turning the shaft and thus adjusting the disk 28. Formed on the hand wheel 44 is a disk 46 which lies flat against a boss 48 on the frame and has therein slots 50 through which extend clamping screws 52 threaded in the frame. It will thus be seen that these clamping screws when tightened serve to hold the disk 28 in adjusted position. To assist the operator in making adjustment, the disk 46 has thereon a mark or notch 54 (Fig. 1) arranged to cooperate with a scale provided on a plate 56 fast on the frame to indicate the adjusted position of the disk 28.

By reason of variable adjustment of the disk 28 relatively to the toothed wheel 16, and also by reason of the fact that the position of the wheel 16 relatively to the disk may vary under different conditions in accordance with variations in the position of the means which is operated through the wheel, the end face of either pawl, at the time when the pawl is released by the segmental projection 30, may be located at a greater or less distance from the tooth on which the pawl is to operate. It may happen therefore that when either pawl is released to permit it to be forced by the spring 26 toward the teeth 18 its end face will be advanced by the pawl carrier into abutting relation to the tooth which it is to operate before the pawl is forced fully into the space between that tooth and the next adjacent tooth. In order to insure that under such conditions the friction between the end face of the pawl and the tooth against which it abuts will not prevent the pawl from being forced fully into the space between the two teeth by the spring 26, the construction herein shown is such as to permit limited movement of the pawl carrier 22 relatively to the pawl against yielding resistance after the end face of the pawl has engaged one of the teeth. For the purpose in view each pawl 24 is not pivoted directly on the stud 23, but is slidingly mounted on a block 58 which turns on the stud and is positioned between two parallel arms 60 of the pawl, so as to permit the block to move relatively to the pawl in a direction lengthwise of the pawl. Mounted in a recess in the pawl is a spring 62 against the resistance of which the block 58 is thus movable. The initial position of the pawl relatively to the block is determined by a pin 64 mounted in one of the arms 60 and extending into a slot 66 in the block, this pin-and-slot connection limiting movement of the pawl under the influence of the spring 62. The plate 32 which cooperates with the segmental projection 30 to control the pawl as hereinbefore described has a tongue-and-groove connection 68 with the block 58 so as to turn with the pawl and the block, and has a finger 70 extending therefrom over the pawl to provide a seat for one end of the spring 26.

It will thus be seen that a yielding connection is provided between each pawl 24 and the pawl carrier 22, so that the pawl carrier will have a short movement relatively to either pawl after the end face of the pawl has arrived in abutting relation to the tooth 18 which it is to operate. In case, therefore, the end face of the pawl, by reason of conditions hereinabove explained, arrives in abutting relation to one of the teeth before the pawl is forced by the spring 26 fully into the space between that tooth and the next adjacent tooth, a slight pause in the forward movement of the pawl occurs to allow time for the pawl to be forced fully into that space before the full force of the pawl is applied to the wheel 16 and accordingly before the friction between the pawl and the tooth which it operates becomes great enough to prevent the spring 26 from seating the pawl properly. Insurance is thus afforded in the operation of the mechanism against any danger of breaking the pawl or one of the teeth by reason of failure of the pawl to be seated properly in the space between two teeth. It will be understood that after the yield of the spring 62 the block 58 abuts against and acts positively on the pawl to operate the latter.

As a further precaution against breakage, the ratchet teeth 18 in the construction shown are not sharply angled teeth, but are blunt on their ends, a portion of the end face of each tooth being inclined inwardly toward the tooth next to it in an anti-clockwise direction. This contributes to the strength of the teeth, while decreasing the distance that the pawl must be moved inwardly by its spring 26 in order to seat it properly after its end face arrives in position to engage one of the teeth. It will be understood that if the pawl first contacts with the above-mentioned inclined end face of a tooth, it is deflected by that tooth toward the tooth next to it in a clockwise direction.

Having described the invention, what I claim as new and desire to secure by Letters Patent of the United States is:

1. In power transmission mechanism, the combination with a member to be operated, of a plurality of teeth arranged in a series and movable with said member, a pawl for operating the member by operative engagement with one of said teeth, a pawl carrier movable to operate the pawl, means for maintaining the pawl out of operative relation to the teeth until after the beginning of the movement of the pawl carrier and for then releasing it to permit it to enter the space between two teeth for operative engagement with one of the teeth as the pawl carrier continues its movement, and means affording provision for limited movement of the pawl carrier relatively to said member after the pawl has arrived in such operative engagement with one of the teeth but before its full force is applied to operate said member to facilitate full movement of the pawl into the space between the two teeth.

2. In power transmission mechanism, the combination with a member to be operated, of a plurality of teeth arranged in a series and movable with said member, a pawl for operating the member by operative engagement with one of said teeth, a pawl carrier movable to operate the pawl, means for maintaining the pawl out of operative relation to the teeth until after the beginning of the movement of the pawl carrier, means for then forcing the pawl into the space between two teeth for operative engagement with one of the teeth as the pawl carrier continues its movement, and yieldable means affording provision for limited movement of the pawl carrier relatively to said member after the pawl has arrived in such operative engagement with one of the teeth but before its full force is applied to operate said member to facilitate full movement of the pawl into the space between the two teeth.

3. In power transmission mechanism, the combination with a member to be operated, of a plurality of teeth arranged in a series and movable with said member, a pawl for operating the member by operative engagement with one of said teeth, a pawl carrier movable to operate the pawl, means for maintaining the pawl out of operative relation to the teeth until after the beginning of the movement of the pawl carrier and for then releasing it to permit it to enter the space between two teeth for operative engagement with one of the teeth as the pawl carrier continues its movement, a spring for moving the pawl into said space when it is thus released, and means affording provision for limited movement of the pawl carrier relatively to the teeth after the pawl has arrived in such operative engagement with one of the teeth but before its full force is applied to operate said member to facilitate full movement of the pawl by said spring into the space between the two teeth.

4. In power transmission mechanism, the combination with a member to be operated, of a plurality of teeth arranged in a series and movable with said member, a pawl for operating the member by operative engagement with one of said teeth, a pawl carrier movable to operate the pawl, means for maintaining the pawl out of operative relation to the teeth until after the beginning of the movement of the pawl carrier, means for then forcing the pawl into the space between two teeth for operative engagement with one of the teeth as the pawl carrier continues its movement, and means controlled by the pawl carrier for pressing the pawl first yieldingly against the tooth operatively engaged thereby to facilitate full movement of the pawl into the space between the two teeth and for thereafter pressing it positively against said tooth.

5. In power transmission mechanism, the combination with a member to be operated, of a plurality of teeth arranged in a series and movable with said member, a pawl for operating the member by operative engagement with one of said teeth, a pawl carrier movable to operate the pawl, means for maintaining the pawl out of operative relation to the teeth until after the beginning of the movement of the pawl carrier, means for then forcing the pawl into the space between two teeth for operative engagement with one of the teeth as the pawl carrier continues its movement, a spring yieldable in response to movement of the pawl carrier relatively to the tooth thus engaged by the pawl for pressing the pawl first yieldingly against said tooth to facilitate full movement of the pawl into the space between the two teeth, and means operated by the pawl carrier for thereafter pressing the pawl positively against said tooth.

6. In power transmission mechanism, the combination with a member to be operated, of a plurality of teeth arranged in a series and movable with said member, a pawl for operating the member by operative engagement with one of said teeth, a pawl carrier movable to operate the pawl, means for maintaining the pawl out of operative relation to the teeth until after the beginning of the movement of the pawl carrier and for then releasing it to permit it to enter the space between two teeth for operative engagement with one of the teeth as the pawl carrier continues its movement, means for forcing the pawl into said space when it is thus released, a connection between the pawl and the pawl carrier constructed to permit limited movement of the pawl carrier relatively to the pawl after the pawl has arrived in such operative engagement with one of the teeth to facilitate full movement of the pawl into the space between the two teeth, and a spring arranged to control the pawl and against the resistance of which the pawl carrier is thus movable relatively to the pawl before the full force of the pawl is applied to operate said member.

7. In power transmission mechanism, the combination with a member to be operated, of a plurality of teeth arranged in a series and movable with said member, a pawl for operating the member by operative engagement with one of said teeth, a pawl carrier movable to operate the pawl, means for maintaining the pawl out of operative relation to the teeth until after the beginning of the movement of the pawl carrier and for then releasing it to permit it to enter the space between two teeth for operative engagement with one of the teeth as the pawl carrier continues its movement, a spring for forcing the pawl into said space when it is thus released, a member supporting the pawl on the pawl carrier and bodily movable relatively to the pawl in response to movement of the carrier after the pawl has arrived in operative engagement with one of the teeth, and a spring yieldable in response to such movement of the member relatively to the pawl.

8. In power transmission mechanism, the combination with a member to be operated, of a plurality of teeth arranged in a series and movable with said member, a pawl for operating the member by operative engagement with one of said teeth, a pawl carrier movable to operate the pawl, means for maintaining the pawl out of operative relation to the teeth until after the beginning of the movement of the pawl carrier and for then releasing it to permit it to enter the space between two teeth for operative engagement with one of the teeth as the pawl carrier continues its movement, a spring for forcing the pawl into said space when it is thus released, a block mounted for turning movement on the pawl carrier and on which the pawl is slidingly mounted to permit movement of the block relatively to the pawl in response to movement of the carrier after the pawl has arrived in operative engagement with one of the teeth, a spring yieldable in response to such movement of the block relatively to the pawl, and means for positively limiting the movement of the block relatively to the pawl.

9. In power transmission mechanism, the combination with a rotatable member, of a plurality of teeth arranged in a series and movable with said member, a pawl for rotating the member by operative engagement of its end face with one of said teeth, a pawl carrier movable about the axis of said member to operate the pawl, a device arranged to hold the pawl out of operative relation to the teeth until after the beginning of the movement of the pawl carrier and then to release it to permit it to enter the space between two teeth and present its end face in abutting relation to one of the teeth as the pawl carrier continues its movement, a spring for forcing the pawl into said space when it is thus released, and a yieldable connection between the pawl and the pawl carrier constructed to permit limited movement of the carrier relatively to the pawl after the pawl has arrived in such abutting relation to one of the teeth but before its full force is applied to operate said member to facilitate full movement of the pawl by said spring into the space between the two teeth.

10. In power transmission mechanism, the combination with a rotatable member, of a plurality of teeth arranged in a series and movable with said member, a pawl for operating the member by operative engagement of its end face with one of said teeth, a pawl carrier movable about the axis of said member to operate the pawl, a device arranged to maintain the pawl out of operative relation to the teeth until after the beginning of the movement of the pawl carrier and then to release it to permit it to enter the space between two teeth and present its end face in abutting relation to one of the teeth as the pawl carrier continues its movement, a block supported on the pawl carrier for turning movement and on which the pawl is slidingly mounted to permit movement of the block lengthwise of the pawl in response to movement of the pawl carrier after the pawl has arrived in such abutting relation to one of the teeth, and a spring against the resistance of which the block is thus movable relatively to the pawl, said block being arranged to transmit movement positively from the pawl carrier to the pawl after its movement relatively to the pawl.

11. In power transmission mechanism, the combination with a member to be operated, of a plurality of teeth arranged in a series and movable with said member, a pawl for operating the member through one of said teeth, a pawl carrier for moving said pawl lengthwise to operate it, and a connection between said pawl and the pawl carrier arranged to act on the pawl first yieldingly and then positively in the movement of said carrier.

12. In power transmission mechanism, the combination with a member to be operated, of a plurality of teeth arranged in a series and movable with said member, a pawl for operating the member through one of said teeth, a pawl carrier for moving said pawl lengthwise to operate it, a block on said pawl carrier mounted for turning movement and on which the pawl is slidingly mounted to permit movement of the block relatively to the pawl lengthwise of the pawl in response to movement of the pawl carrier, and a spring yieldable in response to such movement of the block relatively to the pawl, the block being arranged to transmit movement positively to the pawl after the yield of said spring.

JACOB C. JORGENSEN.